US012580971B2

(12) United States Patent
Fernandez et al.

(10) Patent No.: US 12,580,971 B2
(45) Date of Patent: Mar. 17, 2026

(54) ASSIGNING AGENTS TO COMMUNICATION SESSIONS BASED ON LANGUAGE PREFERENCES IN MOBILE APPLICATIONS

(71) Applicant: The ADT Security Corporation, Boca Raton, FL (US)

(72) Inventors: Isabel Fernandez, Lauderdale by the Sea, FL (US); James Cole, Lauderdale by the Sea, FL (US)

(73) Assignee: The ADT Security Corporation, Boca Raton, FL (US)

(*) Notice: Subject to any disclaimer, the term of this patent is extended or adjusted under 35 U.S.C. 154(b) by 0 days.

(21) Appl. No.: 18/494,391

(22) Filed: Oct. 25, 2023

(65) Prior Publication Data

US 2025/0141938 A1      May 1, 2025

(51) Int. Cl.
*H04L 65/1069*          (2022.01)
*G06Q 10/0631*          (2023.01)
*G06Q 50/47*            (2024.01)

(52) U.S. Cl.
CPC .. *H04L 65/1069* (2013.01); *G06Q 10/063112* (2013.01); *G06Q 50/47* (2024.01)

(58) Field of Classification Search
CPC ........ H04L 65/1069; G06Q 10/063112; G06Q 50/47
See application file for complete search history.

(56) References Cited

U.S. PATENT DOCUMENTS

| | | | |
|---|---|---|---|
| 4,595,980 | A | 6/1986 | Innes |
| 5,841,852 | A | 11/1998 | He |
| 6,078,804 | A | 6/2000 | Alperovich et al. |
| 6,535,596 | B1 | 3/2003 | Frey et al. |
| 7,209,549 | B2 | 4/2007 | Reynolds et al. |
| 7,450,695 | B2 | 11/2008 | Reynolds et al. |
| 8,019,053 | B2 | 9/2011 | Naick et al. |
| 8,306,509 | B2 | 11/2012 | Sigmund et al. |
| 9,167,090 | B2 | 10/2015 | Bentley et al. |
| 9,401,993 | B1 | 7/2016 | van Rensburg et al. |

(Continued)

FOREIGN PATENT DOCUMENTS

| | | |
|---|---|---|
| WO | 9724862 A2 | 7/1997 |
| WO | 2006069034 A1 | 6/2006 |

*Primary Examiner* — Philip C Lee
(74) *Attorney, Agent, or Firm* — Weisberg I.P. Law, P.A.

(57) ABSTRACT

A system is described. The system includes a remote monitoring platform configured to provide computing functionality for alarm monitoring. The remote monitoring platform includes processing circuitry configured to receive, from a backend system configured to provide computing functionality for a rideshare service, a request to initiate a communication session with a user of the rideshare service, obtain a language preference parameter specified for a mobile application for the rideshare service installed in a mobile device of the user, and obtain language capability information for a plurality of agents associated with the remote monitoring platform. The processing circuitry is further configured to assign an agent of the plurality of agents to the communication session based on the language preference parameter and the language capability information, cause the communication session to be established between the agent and the user.

16 Claims, 5 Drawing Sheets

(56) References Cited

U.S. PATENT DOCUMENTS

| | | | | |
|---|---|---|---|---|
| 10,033,870 | B1 * | 7/2018 | Koster | H04M 3/42059 |
| 10,152,718 | B1 * | 12/2018 | Janefalkar | H04L 63/0861 |
| 10,735,591 | B1 * | 8/2020 | Matula | H04M 3/58 |
| 11,510,045 | B2 | 11/2022 | Buechter et al. | |
| 11,710,002 | B1 * | 7/2023 | Betteridge | G06F 40/47 |
| | | | | 704/2 |
| 2007/0160188 | A1 * | 7/2007 | Sharpe | H04M 3/5125 |
| | | | | 379/265.01 |
| 2016/0360037 | A1 | 12/2016 | van Rensburg et al. | |
| 2017/0318012 | A1 * | 11/2017 | Kim | H04L 69/18 |
| 2021/0029239 | A1 * | 1/2021 | Davis | H04L 65/61 |
| 2022/0148040 | A1 * | 5/2022 | Williams | H04N 21/812 |
| 2024/0098464 | A1 * | 3/2024 | Foy | B60W 50/14 |

* cited by examiner

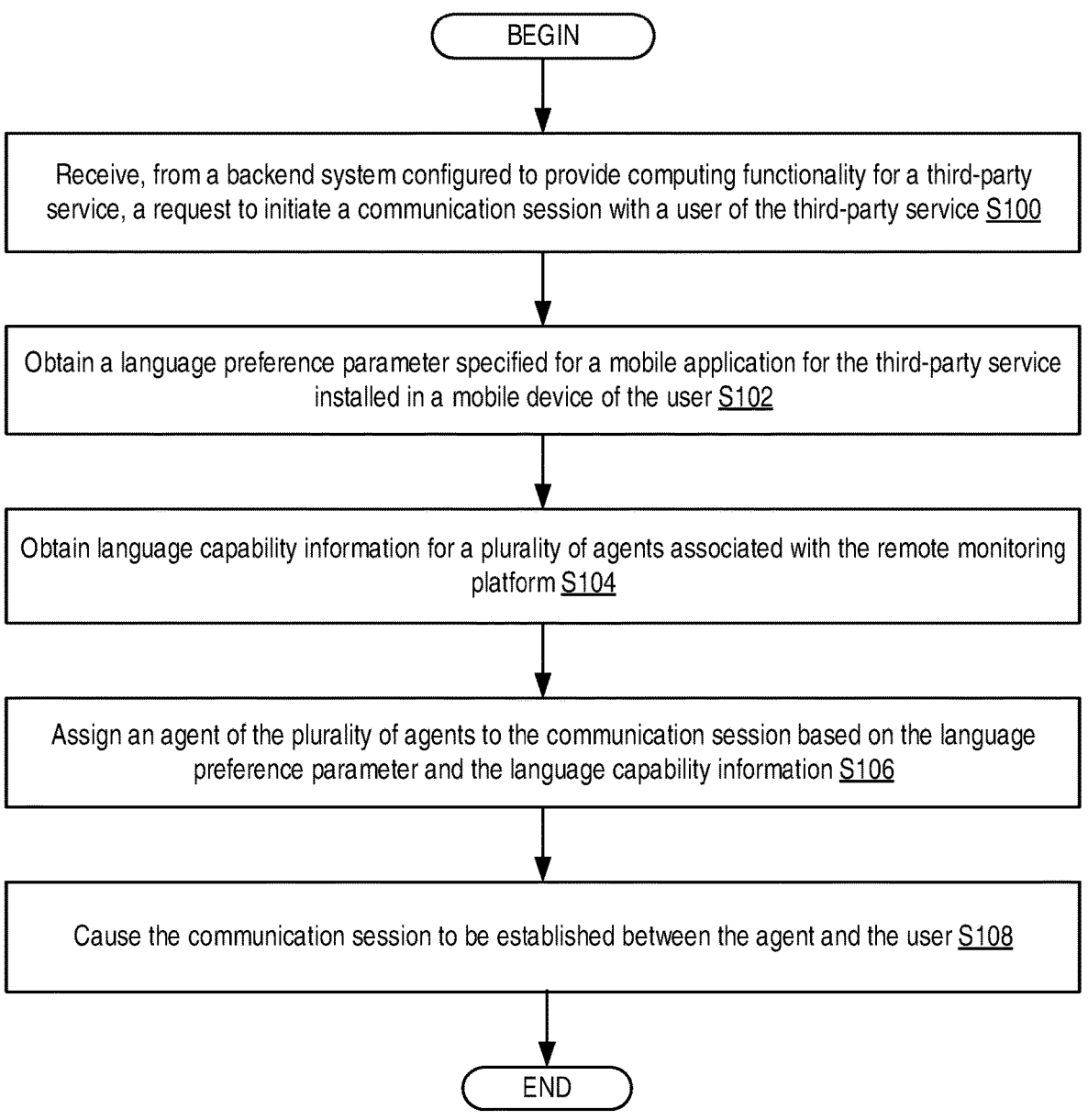

BEGIN

Receive, from a backend system configured to provide computing functionality for a third-party service, a request to initiate a communication session with a user of the third-party service S100

Obtain a language preference parameter specified for a mobile application for the third-party service installed in a mobile device of the user S102

Obtain language capability information for a plurality of agents associated with the remote monitoring platform S104

Assign an agent of the plurality of agents to the communication session based on the language preference parameter and the language capability information S106

Cause the communication session to be established between the agent and the user S108

END

FIG. 5

ASSIGNING AGENTS TO COMMUNICATION SESSIONS BASED ON LANGUAGE PREFERENCES IN MOBILE APPLICATIONS

TECHNICAL FIELD

The present technology is generally related to assigning agents to communication sessions based on language preferences specified in mobile applications.

BACKGROUND

Some software applications (e.g., mobile applications running on mobile devices) provide users with the ability to call or chat with an agent for various reasons. When a user wants to initiate a call or chat using the software application, the user's session may be placed in a queue to wait until the next-available agent can communicate with the user through an audio call, video call, or chat session.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 5 is a flowchart depicting an example of functionality performed by components of the system according to some embodiments of the present disclosure.

DETAILED DESCRIPTION

The present disclosure relates to assigning agents to communication sessions based on language preferences specified in mobile applications.

Figure 1:
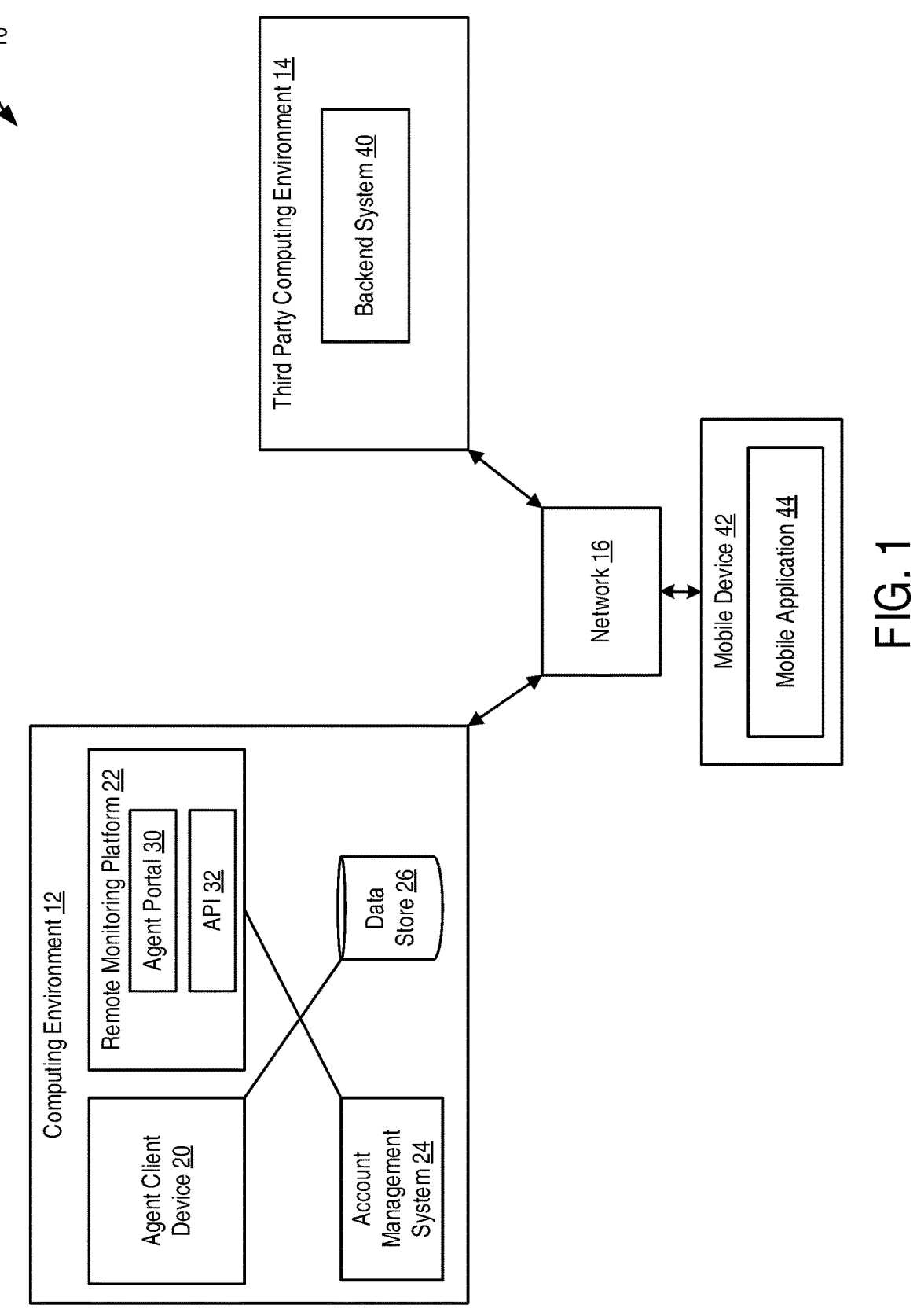
FIG. 1 is a block diagram of an example system according to some embodiments of the present disclosure.

With reference to FIG. 1, shown is a block diagram of an example system 10 according to some embodiments of the present disclosure. System 10 may include a computing environment 12 configured to communicate with a third-party computing environment 14, such as via network 16. In some embodiments, computing environment 12 may include one or more computing systems for providing various monitoring services. For example, computing environment 12 may be operated by a company that provides remote monitoring services for premises alarm systems, such as alarm systems for detecting burglaries, fires, carbon monoxide, etc. at homes. Examples of remote monitoring services may include, for example, detecting alarm events at premises and contacting first responders, such as fire, police, and/or emergency medical services, on behalf of monitoring service customers in the event of an alarm event. Additionally, the company operating computing environment 12 may provide services in which monitoring agents can communicate electronically with people who request assistance for various reasons.

Computing environment 12 may include agent client device 20, remote monitoring platform 22, account management system 24, and data store 26. Remote monitoring platform 22 may include agent portal 30 and application programming interface (API) 32.

Third-party computing environment 14 may include one or more computing systems for performing various functionality provided by a company that is a third-party relative to the company that operates computing environment 12. For example, the companies operating computing environment 12 and third-party computing environment 14 may enter into an agreement in which one company provides services for customers and/or employees of the other company. In some embodiments, the company operating third-party computing environment 14 may engage the company operating computing environment 12 to provide services involving monitoring agents who can communicate with customers, employees, etc., when they request assistance.

Third-party computing environment 14 may include a backend system 40 and/or other components. Backend system 40 may perform various functionality on behalf of the company that operates third-party computing environment 14. For example, if the company operating the third-party computing environment 14 provides rideshare services, backend system 40 may include components that handle rider rideshare requests, trip routing, trip monitoring, rider and driver account management, etc. As another example, third-party computing environment 14 may be operated by a company that has employees who travel for work, and backend system 40 may include the components that arrange employee travel, monitor locations of work vehicles, track and manage work orders, etc. As another example, third-party computing environment 14 may be operated by a company that provides an online dating platform, and the backend system 40 may include components that facilitate users creating online dating profiles, browsing other users' online dating profiles, etc.

System 10 may also include a mobile device 42. Mobile device 42 may include mobile application 44. As will be described in further detail below, mobile device 42 may be a device, such as a smart phone or smart watch, that a customer or employee of the company operating the third-party computing environment 14 may operate.

Agent client device 20 may be configured to provide one or more functions usable by a monitoring agent to communicate with a user of mobile device 42 during a communication session. A monitoring agent may be a human agent that may use agent client device 20 to access agent portal 30 to communicate with a user of mobile device 42 during a communication session. Alternatively, a monitoring agent may be a virtual agent that can automatically generate and respond to messages and perform automated functions in response to events or communications during a communication session.

A communication session according to various embodiments may include, for example, an audio call, a video call, an electronic chat session, or other ways for a monitoring agent and a user of the mobile device 42 to communicate. In some embodiments, a communication session may be initiated by a user of the mobile device 42 to communicate electronically with an agent for assistance with an emergency (e.g., an automobile accident or threat to life), a non-emergency issue (e.g., a technical problem with the mobile application 44 and/or other issues). A communication session can be initiated by a monitoring agent or a user of the mobile device 42. Alternatively, a communication session can be initiated automatically by mobile application 44 of the mobile device 42 in response to various events, such as the mobile application 44 detecting audio indicative of an emergency or a sudden acceleration or deceleration indicative of an automobile crash or another event.

Remote monitoring platform 22 may be configured to perform and/or trigger one or more functions and/or processes performed by computing environment 12, such as, for example, functions and/or processes associated with routing communication sessions to appropriate monitoring agents based on language preferences specified in mobile application 44 of mobile device 42 and/or the operating system of the mobile device 42. Further, remote monitoring platform 22 may be configured to provide agent portal functions, create and maintain one or more queues for communication sessions, assign agents to communication sessions based on language capabilities, workload, etc., and maintain records of communications.

Agent portal 30 may be an electronic portal hosted in and provided by the remote monitoring platform 22. Agent portal 30 may provide a user interface configured to depict information associated with communication sessions, agents, users, etc. A monitoring agent, using an agent client device 20, can access the agent portal 30. Agent portal 30 may encode for rendering on the agent client device 20 user interfaces that include information associated with the user of mobile device 42, communication sessions, monitoring agents, queues of users waiting to communicate with an agent, etc. In some embodiments, the agent client device 20 may access agent portal 30 of remote monitoring platform 22 using a web browser. In other embodiments, agent client device 20 may include one or more dedicated applications for accessing, interacting with, and/or controlling agent portal 30 and/or other components of remote monitoring platform 22.

In some embodiments, agent portal 30 is a web portal hosted in the remote monitoring platform 22, and the agent client device 20 is a personal computer or another type of computing device that can access agent portal 30. The agent portal 30 may encode for rendering on the agent client device 20 one or more user interfaces to facilitate the monitoring agent communicating with the user of the mobile device 42, communicating with first responders, manually transferring communication sessions, and interacting with the remote monitoring platform 22.

In some embodiments, agent portal 30 may be configured to facilitate agents associated with computing environment 12 initiating one or more actions. For example, in the event that a communication session is established between an agent and a user of mobile device 42, the agent portal 30 may render for display various information associated with the third-party computing environment 14 and mobile device 42 so that the agent may obtain information that may facilitate the agent assisting the user. For example, information that may be displayed for a monitoring agent may include information indicating that the user of the mobile device 42 is involved in an automobile accident. Additionally, the agent portal 30 may facilitate assisting the user by, for example, displaying information for contacting first responders, such as fire, ambulance, or police services, etc. The web portal 30 may also display information indicating the preferred language of the user that corresponds to a specified language preference for mobile application 44.

API 32 of remote monitoring platform 22 may be configured to facilitate communication between remote monitoring platform 22 and one or more other components of system 10. For example, API 32 may be configured to facilitate backend system 40 providing information to the remote monitoring platform 22 associated with a user who is communicating with a monitoring agent using mobile application 44. Additionally, backend system 40 may use API 32 to obtain information from remote monitoring platform 22 associated with one or more communication sessions handled through remote monitoring platform 22.

When a request to initiate a communication session has been received, account management system 24 may associate a communication session with an account, such as a monitoring services account. The account may be a pre-existing account that was created by account management system 24 prior to the incoming request to initiate a communication session. Alternatively, if no account exists, an account may be created by account management system 24 (and/or remote monitoring platform 22) when the request to initiate a communication session is received by remote monitoring platform 22 or when a communication session is established for the user. For example, if a request to initiate a communication session is received by remote monitoring platform 22, remote monitoring platform 22 may determine, such as via account management system 24, that a pre-existing account associated with the incoming communication does not exist and create or cause account management system 24 to create the account.

Account management system 24 may also provide various account linking functionality. For example, account management system 24 may link an account for a product or service provided through third-party computing environment 14 to another customer account associated with computing environment 12. By linking the two accounts, the account management system 24 may facilitate computing environment 12 in obtaining data generated by backend system 40 in third-party computing environment 14 for analysis and/or processing. In one example, computing environment 12 retrieves content and manages the content provided by mobile device 42 as part of, for example, an authentication process, creation of customer accounts, language preference, etc.

Data store 26 may at least temporarily store data for retrieval, management and/or analysis. In particular, data store 26 may be configured to at least temporarily store content associated with remote monitoring platform 22. As examples, the data stored in the data store 26 can include, but is not limited to, communication session data, account data, language preference data, and other types of data. Additionally, data store 26 may store information about the monitoring agents. Such information may include, for example, information specifying the languages that individual agents can speak and/or read and write. The remote monitoring platform 22 may use the language capabilities information when assigning agents to communication sessions to assist users, as discussed further below.

Backend system 40 may be configured to perform various functionality for third-party computing environment 14. For example, backend system 40 may provide server computer functionality for mobile application 44. Backend system 40 may also provide computing resources to facilitate the operator of third-party computing environment 14 providing services for its customers. As an example, if the third-party computing environment 14 is operated by a provider of ride-sharing services, the backend system 40 may be configured to coordinate and arrange rides between drivers and riders, track rides, etc. Backend system 40 may also be configured to communicate with the remote monitoring platform 22 of the computing environment 12 via the API 32. In addition, backend system 40 may provide communication functions to establish, maintain, or terminate communication between mobile device 42 and remote monitoring platform 22 via backend system 40.

Mobile device 42 may be a smartphone, tablet computer, personal computer, wearable device, or another type of device that a user can operate to interact with backend system 40 and/or remote monitoring platform 22 and/or to communicate with a monitoring agent. Mobile application 44 may be installed in mobile device 42 and facilitate a user interacting with backend system 40 of third-party computing environment 14. Additionally, mobile application 44 may facilitate a user communicating with an agent associated with remote monitoring platform 22 during a communication session. In various embodiments, mobile application 44 may be provided by the company that operates the third-party computing environment 14 for interacting with the backend system 40. For example, if backend system 40 provides functionality for ridesharing services, a user can use mobile application 44 to request a ride. If backend system 40 provides an online dating platform, a user can use mobile application 44 to manage his or her online dating profile, to browse other users' profiles, and to communicate with other users of the online dating platform. If backend system 40 is a system that provides services for employees of third-party computing environment, users may use mobile application 44 for attendance tracking (e.g., to "clock in" or "clock out"), to manage and track visits to customer sites, etc.

Additionally, mobile application 44 may be configured to facilitate the user specifying a language preference for the mobile application 44. To this end, the mobile application 44 may include, for example, dropdown list or other user interface element that the user may select to indicate his or her preferred language for communication. For instance, a user may select "Spanish" in a dropdown list, and the mobile application 44 may render audio and text for the user using the Spanish language. In some embodiments, the preferred language for mobile application 44 may default to the preferred language specified in an operating system of mobile device 42.

Further, the user of mobile device 42 may use mobile application 44 to request to initiate a communication session with an agent associated with remote monitoring platform 22 via backend system 40. The request to initiate a communication session may include language preference information for mobile application 44, and remote monitoring platform 22 may an agent to the communication session based on the language preference information. For example, the remote monitoring platform 22 may attempt to assign an agent capable of communicating in the preferred language to the communication session.

The agent may perform actions may during and/or after the communication session. For example, a user of mobile device 42 may be a driver providing a shared ride service. The driver may notice that a passenger is becoming sick and may wish to request assistance from an agent such as to dispatch first responders. The driver may request to initiate the communication session with a monitoring agent via mobile application 44. The request may be received by backend system 40, which may transmit the request to remote monitoring platform 22. Remote monitoring platform 22 may receive the request to initiate the communication session and associate the user with a spot in a queue to await a communication session with a monitoring agent. In some embodiments, the queue may be a first-in-first-out queue in which communication sessions between monitoring agents and users are established in the order in which the users were added to the queue. In alternative embodiments, remote monitoring platform 22 may apply prioritization rules in which the order that communication sessions are established is based on the roles of users or other factors. As an example of a prioritization rule, remote monitoring platform 22 may prioritize a request to establish a communication session that was manually initiated by a user operating mobile application 44 over a request that was automatically initiated by the mobile application 44 without user involvement. When it is a particular user's turn to communicate with a monitoring agent, remote monitoring platform 22 may determine whether any monitoring agents are capable of speaking the language specified as the preferred language for the mobile application 44 and, if so, assign such an agent to communicate with the user. The communication session between the user and the monitoring agent may then be established, and the monitoring agent can then communicate with the user and provide assistance.

Components of system 10 may communicate with each other via one or more networks 16 (collectively referred to as network 16). Network 16 can include, for example, one or more intranets, extranets, wide area networks (WANs), local area networks (LANs), wired networks, wireless networks, satellite networks, Data Over Cable Service Interface Specification (DOCSIS) networks, cellular networks, Plain Old Telephone Service (POTS) networks, and/or other types of networks. Network 16 may support one or more communication protocols, one or more wired communication links, one or more wireless communication links, etc.

Figure 2:
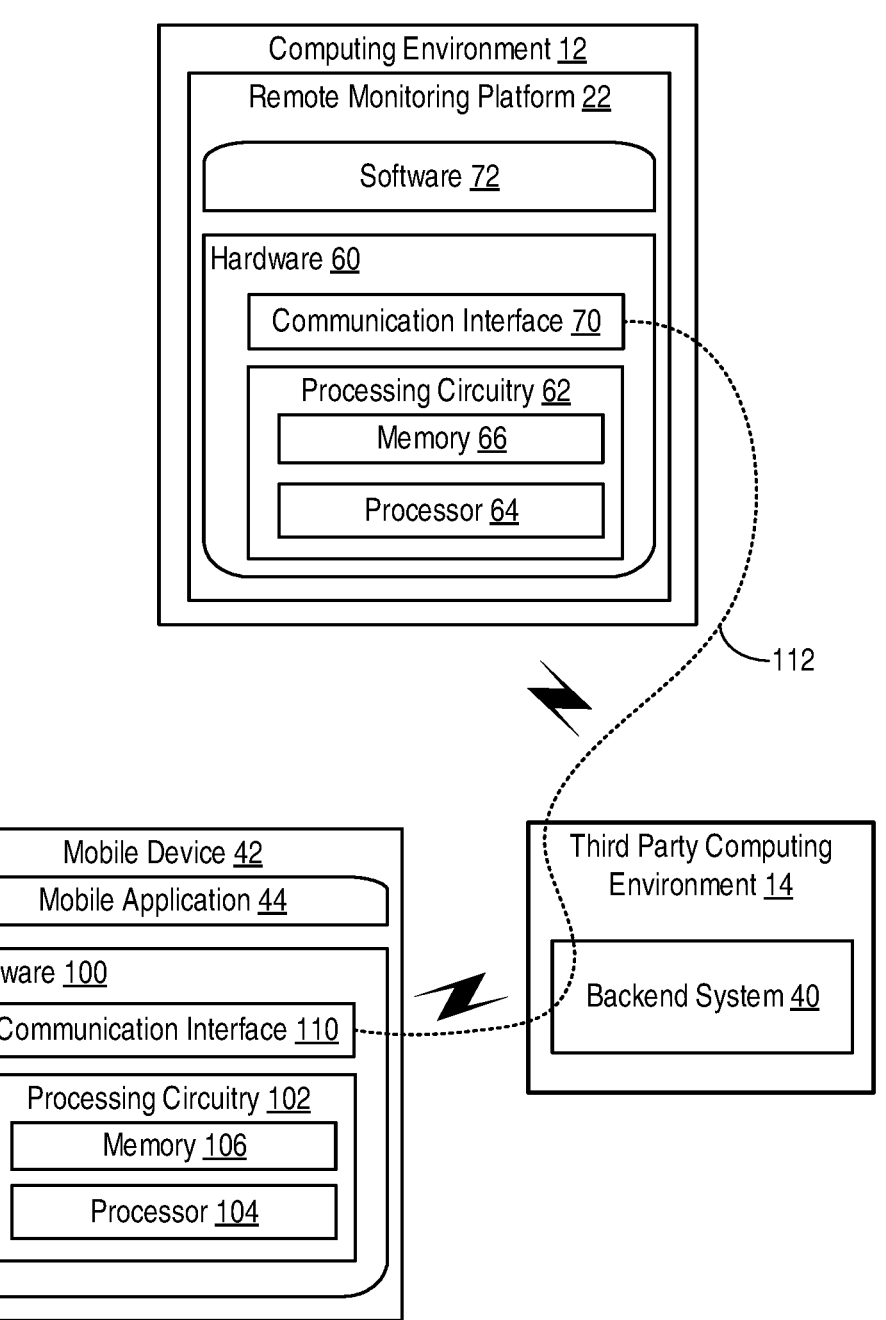
FIG. 2 is a block diagram of an example of the computing environment and third-party computing environment of FIG. 1 according to various embodiments of the present disclosure.

Referring to FIG. 2, shown is a block diagram illustrating examples of various components of system 10. As shown, computing environment 12 may comprise remote monitoring platform 22 that is configured to perform one or more computing environment functions that are described herein. The remote monitoring platform 22 may comprise one or more servers and/or other types of computers. According to various embodiments, the servers can be located in a single geographical location (e.g., a single datacenter) or distributed across multiple geographic locations. In some embodiments, the servers can operate as part of an elastic computing resource in which the allotted capacity of computing-related resources may vary over time.

Remote monitoring platform 22 comprises hardware 60. The hardware 60 may include processing circuitry 62. The processing circuitry 62 may include one or more processors 64 and one or more memories 66. Each processor 64 may include and/or be associated with one or more central processing units, data buses, buffers, and interfaces to facilitate operation. In addition to or instead of a processor 64 and memory 66, the processing circuitry 62 may comprise other types of integrated circuitry that performs various functionality. Integrated circuitry may include one or more processors 64, processor cores, field programmable gate arrays (FPGAs), application specific integrated circuits (ASICs), graphics processing units (GPUs), Systems on Chips (SoCs), or other components configured to execute instructions. The processor 64 may be configured to access (e.g., write to and/or read from) the memory 66, which may comprise any kind of volatile and/or nonvolatile memory, e.g., cache, buffer memory, random access memory (RAM), read-only memory (ROM), optical memory, and/or erasable programmable read-only memory (EPROM). Further, memory 66 may be embodied in the form of one or more storage devices. The processing circuitry 62 may be configured to perform various functionality described herein. For example, computer instructions may be stored in memory 66 and/or another computer-readable medium that, when executed by processor 64, causes the processor 64 to perform various functionality.

Hardware 60 of remote monitoring platform 22 may include communication interface 70, which may facilitate remote monitoring platform 22 communicating with one or more elements in system 10. For example, communication interface 70 may be configured for establishing and maintaining at least a wireless or wired connection with one or more elements of system 10. For example, communication interface 70 may be configured to establish and maintain at least a wireless or wired connection with third-party computing environment 14 such as with, for example, via API 32.

Remote monitoring platform 22 further has software 72 (which may include one or more software applications) stored internally in, for example, memory 66, or stored in external memory (e.g., database, storage array, network storage devices, etc.) accessible by the remote monitoring platform 22 via an external connection. Software 72 may include any software or program that configures processing circuitry 62 to perform the steps or processes of the present disclosure. Software 72 may provide agent portal 30 and API 32.

The processing circuitry 62 may be configured to control any of the methods and/or processes described herein and/or to cause such methods, and/or processes to be performed, e.g., by remote monitoring platform 22. Processor 64 corresponds to one or more processors 64 for performing remote monitoring platform 22 functions described herein. The memory 66 is configured to store data and/or files such as remote monitoring computing environment data and/or other information/data. In some embodiments, the software 72 may include instructions that, when executed by the processor 64 and/or processing circuitry 62, causes the processor 64 and/or processing circuitry 62 to perform the processes described herein with respect to remote monitoring platform 22. Accordingly, by having computer instructions stored in memory 66 accessible to the processor 64, the processor 64 may be configured to perform the actions described herein.

Still referring to FIG. 2, mobile device 42 comprises hardware 100. The hardware 100 may include processing circuitry 102. The processing circuitry 102 may include one or more processors 104 and one or more memories 106. Each processor 104 may include and/or be associated with one or more central processing units, data buses, buffers, and interfaces to facilitate operation. In addition to or instead of a processor 104 and memory 106, the processing circuitry 102 may comprise other types of integrated circuitry that performs various functionality. Integrated circuitry may include one or more processors 104, processor cores, FPGAs, ASICs, GPUs, and/or SoCs or other components configured to execute instructions. The processor 104 may be configured to access (e.g., write to and/or read from) the memory 106, which may comprise any kind of volatile and/or nonvolatile memory, e.g., cache, buffer memory, RAM, ROM, optical memory, and/or EPROM. Further, memory 106 may be embodied in the form of one or more storage devices. The processing circuitry 102 may be configured to perform various functionality described herein. For example, computer instructions may be stored in memory 106 and/or another computer-readable medium that, when executed by processor 104, causes the processor 104 to perform various functionality described herein.

Hardware 100 of mobile device 42 may include communication interface 110 enabling mobile device 42 to communicate with one or more elements in system 10. For example, communication interface 110 may be configured for establishing and maintaining at least a wireless or wired connection with one or more elements of system 10, such as remote monitoring platform 22.

Mobile device 42 further includes mobile application 44 (which may include one or more software applications) as described with respect to FIG. 1. Mobile application 44 may include any software or program that configures processing circuitry 102 to perform the steps or processes of the present disclosure.

The processing circuitry 102 may be configured to control any of the methods and/or processes described herein and/or to cause such methods, and/or processes to be performed, e.g., by mobile device 42. Processor 104 corresponds to one or more processors 104 for performing mobile device 42 functions described herein. The memory 106 is configured to store data and/or files such as mobile device data and/or other information/data. In some embodiments, the mobile application 44 may include instructions that, when executed by the processor 104 and/or processing circuitry 102, cause the processor 104 and/or processing circuitry 102 to perform the processes described herein with respect to mobile device 42. Accordingly, by having computer instructions stored in memory 106 accessible to the processor 104, the processor 104 may be configured to perform the actions described herein.

In some embodiments, a communication session between mobile device 42 and remote monitoring platform 22 may occur via communication link 112. That is, communication interface 110 of mobile device 42 may be configured to communicate with communication interface 70 of remote monitoring platform 22 via backend system 40. For example, the user of mobile device 42 may provide an input to mobile application 44 to request a communication session with a monitoring agent associated with remote monitoring platform 22. Mobile application 44 and/or processing circuitry 102 may cause communication interface 110 to establish communication link 112 between communication interface 70 and communication interface 110 via backend system 40. The portion of communication link 112 between backend system 40 and communication interface 70 may be facilitated by API 32.

Figure 3:
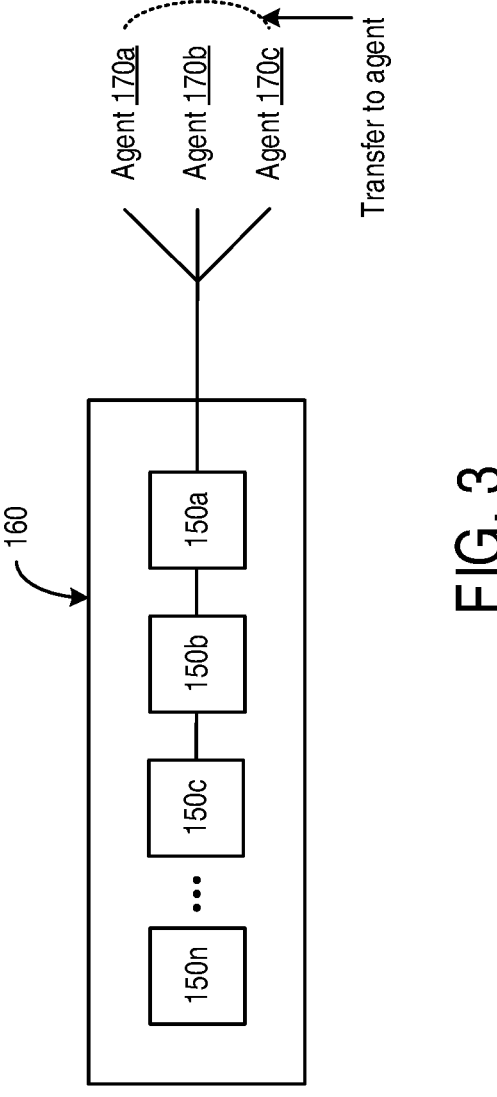
FIG. 3 shows an example implementation of the system according to some embodiments of the present disclosure.

FIG. 3 shows an example implementation of the system 10, and in particular, an example of a queue 106 that has been created and managed by remote monitoring platform 22 in accordance with various embodiments of the present disclosure. As illustrated in FIG. 3, multiple users 150a-150n (collectively, users 150) of mobile applications 44 have been assigned respective spots in the queue 160 to wait to communicate with monitoring agents 170a-170c (collectively, agents 170) associated with the remote monitoring platform 22. In some embodiments, the queue 160 may be a first-in-first-out queue in which respective communication sessions between users 150 and agents 170 are established in the order in which the users 150 requested to initiate a communication session. In alternative embodiments, the remote monitoring platform 22 may apply prioritization rules in which certain users 150 are given priority over other users 150 when determining the order in which communication sessions between users 150 and agents 170 are established.

In the example illustrated in FIG. 3, user 150a is the next user 150 to have a communication session established with an agent 170. In accordance with various embodiments of the present disclosure, the remote monitoring platform 22 may obtain language preference information that indicates the preferred language that the user 150 specified for the mobile application 44. In some embodiments, the language preference information may be provided as a language preference parameter as part of the request to initiate a communication session. In other embodiments, the remote monitoring platform 22 may obtain the language preference information after receiving the request to initiate a communication session by the remote monitoring platform 22 requesting the information from the backend system 40 or the mobile device 42, and the backend system 40 or mobile device 42 may return the requested information.

As further illustrated in FIG. 3, the remote monitoring platform 22 may use the received language preference information to establish a communication session with an agent client device 20 operated by an agent 170 who is capable of communicating in the language specified in the language preference information. More specifically, the remote monitoring platform 22 may determine whether there are any agents 170 who are capable of communicating with the user 150 in the preferred language and are also available to join a communication session. To this end, the remote monitoring platform 22 can consult agent language information stored in data store 26 to determine the language capabilities of the agents 170. If a particular agent 170 is available and capable of communicating in the preferred language, the remote monitoring platform 22 can create a communication session for the user 150a and assign the particular agent 170 to the communication session to assist the user 150a. If there are no agents 170 available who can communicate in the preferred language, the remote monitoring platform 22 can assign an agent 170 who is capable of communicating in a default language (e.g., English) to the communication session, and the agent 170 can later add another agent 170 capable of communicating in the preferred language to the communication session when the agent portal 30 indicates that the agent 170 who can communicate in the preferred language becomes available to assist the user 150. In some embodiments, the agent 170 can add the other agent 170 to the communication session by selecting a button or other user interface element generated by the agent portal 30.

A communication session can be established for a user 150 in various ways. For example, remote monitoring platform 22 can cause an electronic chat session to be created in which user 150 of mobile application 44 and an agent 170 can communicate through electronic messages via agent portal 30 and mobile application 44. In alternative embodiments, establishing a communication session can include an agent 170 sending a short messaging service (SMS) message to the mobile device 42 of the user 150 to begin a SMS messaging session. As another example, establishing a communication session can include initiating a telephone call between the user 150 and agent 170.

Figure 4:
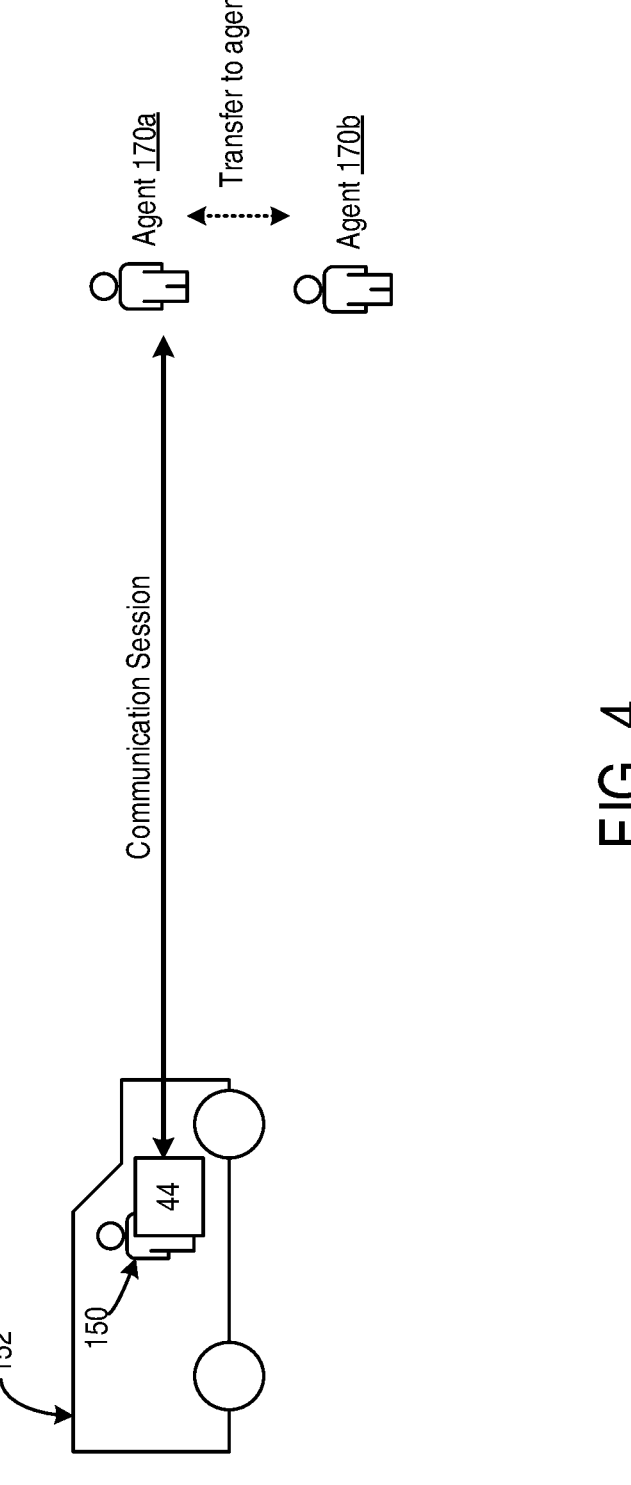
FIG. 4 shows another example implementation of the system according to some embodiments of the present disclosure.

FIG. 4 shows another example implementation of the system 10 according to some embodiments of the present disclosure. In this example, user 150 is a rideshare driver associated with vehicle 152. User 150 has experienced an incident and has requested to initiate a communication session with an agent 170a for assistance. In the illustrated example, remote monitoring platform 22 has attempted to assign an agent 170 that is capable of communicating in the language specified as the preferred language for the mobile application 44, but there were no such agents 170 available at the time. As such, remote monitoring platform 22 has assigned agent 170a, who is not capable of communicating in the preferred language, to a communication session with the user 150. In the present example, agent 170b is capable of communicating in the preferred language specified for mobile application 44 and has become available to assist the user 150 after agent 170a has already begun communicating with user 150. According to various embodiments of the present disclosure, agent portal 30 may provide to agent 170a, via one or more user interfaces, information indicating the availability of agent 170b. When a user interface indicates that agent 170b is available to assist user 150, agent 170a may initiate a request for agent 170b to join the communication session with the user 150. Agent 170b may accept the request via the agent portal 30, and the remote monitoring platform 22 may assign agent 170b to the communication session with the user 150. Additionally, agent 170a may leave the communication session and, as a result, become available to participate in a communication session with another user.

FIG. 5 is a flowchart depicting an example of functionality performed by components of the system 10 (e.g., remote monitoring platform 22 and one or more of its components, mobile device 42 and one or more of its components, etc.). More specifically, system 10 includes remote monitoring platform 22 configured to provide computing functionality for alarm monitoring. The remote monitoring platform 22 is configured to receive (Block S100), from a backend system 40 configured to provide computing functionality for a third-party service (e.g., ride share service, etc.), a request to initiate a communication session with a user 150 of the third-party service. The remote monitoring platform 22 is further configured to obtain (Block S102) a language preference parameter specified for a mobile application 44 for the third-party service installed in a mobile device 42 of the user 150, and obtain (Block S104) language capability information for a plurality of agents 170 associated with the remote monitoring platform 22. The remote monitoring platform 22 is further configured to assign (Block S106) an agent 170 of the plurality of agents 170 to the communication session based on the language preference parameter and the language capability information, and cause (Block S108) the communication session to be established between the agent 170 and the user 15.

In some embodiments, the remote monitoring platform 22 is further configured to determine, based on the language capability information, that another agent 170 of the plurality of agents 170 is capable of communicating using a language corresponding to the language preference parameter specified for the mobile application 44 for the backend system 40 and encode for display at least one user interface that indicates an availability status of the other agent 170.

In some other embodiments, the at least one user interface further comprises at least one user interface element that facilitates the other agent being added to the communication session.

In some embodiments, the remote monitoring platform 22 is further configured to maintain a queue 160 for a plurality of users 150 associated with a plurality of requests to initiate a plurality of communication sessions.

In some other embodiments, the remote monitoring platform 22 is further configured to assign the agent 170 to the communication session further based on at least one of a time of day the communication session is received, a day of a week the communication session is received, or a third-party preference established by a third party associated with a second service provided by the third-party to a mobile device 42.

In some embodiments, the remote monitoring platform 22 is further configured to receive the language preference parameter from the backend system 40.

In some other embodiments, the language preference parameter is included with the request to initiate the communication session.

In some embodiments, the remote monitoring platform 22 is further configured to request the language preference parameter from a mobile device 42 of the user 150 in which the mobile application 44 is installed.

In some other embodiments, the remote monitoring platform 22 is further configured to receive the language preference parameter from the mobile device 42 of the user 150 in which the mobile application 44 is installed.

In some embodiments, the remote monitoring platform 22 is further configured to request the language preference parameter from the backend system 40.

Next, additional examples of operation of the system 10 are provided. As a first example, if the language preference parameter of mobile application 44 indicates that a user has set her preferred language for mobile application 44 as Spanish, and if a Spanish-speaking monitoring agent 170 is available, the remote monitoring platform 22 may assign the Spanish-speaking agent 170 to a communication session with the user. However, if the language preference parameter indicates that a user has set her preferred language as Spanish and a Spanish-speaking agent 170 is not available, then the remote monitoring platform 22 may assign a non-Spanish-speaking monitoring agent 170 to the communication session. The initially-assigned monitoring agent 170 can then communicate with the user 150 and monitor the status of the Spanish-speaking agents 170 via a user interface of the agent portal 30. When the user interface indicates that a Spanish-speaking agent is available, the initial agent 170 assigned to the communication session can manually initiate a transfer the communication session to the Spanish-speaking agent 170 via a user interface for the agent portal 30. In this way, a non-Spanish-speaking agent 170 may temporarily communicate with the user 150 until a Spanish-speaking agent 170 becomes available for the communication session.

As another example, if the language preference parameter for a user indicates that the user has set English as her preferred language, and if all agents 170 are capable of speaking English, the remote monitoring platform 22 may assign the next available agent 170 to the communication session.

In some embodiments, the remote monitoring platform 22 may implement a rule in which it does not assign Spanish-speaking agents 170 to communication sessions in which the users' preferred language parameter indicates that English is their preferred language. In some other embodiments, the remote monitoring platform 22 may implement a rule in which the remote monitoring platform 22 assumes that the user's preferred language is English if a language preference parameter is not specified. That is, a particular language may be assumed as the default language.

In some embodiments, since users 150 of the mobile application 44 may not have an account associated with computing environment 12 (e.g., an entity providing the assistance service such as a security monitoring company) before the first time the users 150 initiate a communication session, remote monitoring platform 22 may create an account record in response to receiving the communication session via backend system 40. The language preference may be stored in the newly created record along with other information associated with the user 150.

In some other embodiments, terms of service associated with a service provided by the corresponding computing environment may be used to assign agents 170 to a communication session. For example, a communication session may be assigned to an agent 170 based on service information associated with a service provided by the remote monitoring platform 22 (e.g., monitoring service) to third-party computing environment 14 and the user 150 of the mobile device 42. In some other embodiments, the communication session is assigned to an agent 170 based on a third-party preference established by a third party associated with another service (e.g., ride sharing service) provided by the third party to the user 150 of the mobile device 42. For example, a third-party associated with the third-party computing environment 14 may have special requirements to skip a bilingual agent 170 and assign the communication session to a monolingual agent 170. If no monolingual agent 170 is available, then the communication session may be routed to the bilingual agent 170. In some embodiments, if the language preference is French and there are no agents 170 available, the communication session may be held (in a queue 160) until a French speaking agent 170 is available. If there are no agents 170 available that speak French, notifications via agent portal 30 may be provided, and emails sent accordingly.

In some embodiments, agent portal 30 may encode for rendering on the agent client device 20 a graphical user interface that provides the language preference of the user 150 of mobile device 42 to agents 170. This may help the agents 170 identify the user preferred language. The graphical user interface may also be in a default language, such as English, unless there is a requirement from the third-party to translate it.

In some other embodiments, the graphical user interface associated with agent portal 30 displays user account information, including language preference indicated by the user 150 on mobile device 42.

In some embodiments, communication of text messages (and other messages) between the agent 170 and the mobile device user 150 may be performed based on the mobile device user language preferences.

In some other embodiments, if emergency contacts are provided by the user 150 of mobile device 42, assignment of communication sessions and communication may be performed based on the language preference of the emergency contact. For example, a user 150 may provide, via mobile device 42, contact information and preferred language parameter of a person that may be contacted by agents 170 or first responders in case of an emergency. The person may be referred to as an emergency contact and may be someone that the user 150 has designated to be informed about the emergency. A communication session may be assigned to an agent 170 based on the preferred language of the emergency contact so that the agent 170 may communicate with the emergency contact using the preferred language.

In some other embodiments, once the communication session requesting assistance is received by remote monitoring platform 22, the communication session may be assigned to an agent 170, even if the language preference information does not include a language that is supported. For example, if the language preference information includes English or French, communication session may be assigned to agents 170 able to communicate using French or English. However, if the language preference information includes a language that is not supported by the monitoring service provided by remote monitoring platform 22 and agents 170, remote monitoring platform 22 may find any available agent 170 and assign the communication session to the available agent 170. Further, although, a next available agent 170 may be assigned, the communication session may include a request to skip the bilingual agents 170 and to route the communication session to a monolingual agent 170 if available. If no monolingual agent 170 is available, then the communication session may be assigned to a bilingual agent 170.

In some other embodiments, active agents 170 (e.g., bilingual and English-only agents) may be assigned to communication sessions. In some other embodiments, per round robin rules, a bilingual agent 170 may be assigned to receive the next communication session. If a communication session indicates an English language preference, the bilingual agent 170 may be skipped, and the communication session may be assigned or routed to the monolingual agent 170. Further, as an example, if a communication session indicates a French language preference, the communication session may be assigned to a bilingual agent 170 since there are no monolingual language agents 170 who can communicate in French and who are currently active.

In some embodiments, the communication session may be associated with an incident. In some embodiments, the communication session triggers remote monitoring platform 22 to create a record (i.e., incident record accessible by agent 170). The record may include information about a partner of the service provider providing the assistance services to the user 150. The record may also include communication methods (e.g., voice, chat, video call, etc.). The record may also include a link to standard operating procedures, call back numbers, partner customer service number, disposition codes, etc.

In some embodiments, remote monitoring platform 22 may facilitate an agent 170 transferring a communication session to another available agent 170 based on language preference parameters obtained from the mobile application 44. For example, assume an English-only agent 170 is initially assigned to a communication session with a user whose preferred language parameter indicates that Spanish is her preferred language. The agent 170 may click a link (provided on a graphical user interface generated by the agent portal 30) to initiate a transfer of the communication session to a Spanish-Speaking agent 170. Remote monitoring platform 22 may check whether a Spanish agent 170 is available to receive the transfer. If no Spanish agent is available, an alert advising agent "No Spanish Agent is available" may be generated. The alert may indicate the agent 170 to follow standard operating procedures for handling a customer "Speaking a NonEnglish Language". If a Spanish speaking agent 170 is available, once the Spanish agent 170 is assigned, an alert may be generated which indicates "Transfer Successful". The transferring agent 170 is returned to the wait screen (or dashboard, if supervisor acting in agent role). Upon assignment to the Spanish speaking agent 170, Spanish language rules may become active (e.g. automated SMS messages are in Spanish), etc.

In some embodiments, a graphical user interface rendered by agent portal 30 may provide a link or button to transfer a communication session. In addition, the graphical user interface may provide a confirmation dialog box. The link may be titled or labeled "Transfer to Spanish Queue". A confirmation dialog box such as "You are about to transfer this incident to another agent" may be shown. The dialog box may be used to avoid accidental transfer of communication sessions. Further, a communication log may indicate a communication session was transferred from the agent 170. A header indicating "Incident Transferred", and a message line indicating "From: <transferring agent username>" may be used.

Although languages such as English, French, and Spanish have been used in the examples above, the embodiments of the present disclosure are not limited to such languages. That is, any language or combination of languages is possible.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, signaling (e.g., radio signaling, infrared signaling or optical signaling), for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system that is configured to communicate with a third-party computing environment, the third-party computing environment including a third-party backend system that is configured to provide computing functionality for a rideshare service, the system comprising:

a first computing environment including a remote monitoring platform and being configured to communicate with a second computing environment that includes a third-party backend system;

the remote monitoring platform configured to provide computing functionality for an alarm monitoring service to a user of the third-party backend system, the third-party backend system being configured to provide computing functionality for the rideshare service, the remote monitoring platform comprising processing circuitry configured to:

receive, from the third-party backend system, a request to initiate a communication session between the user of the rideshare service and the remote monitoring platform of the first computing environment, the request including a language preference parameter that is preconfigured for a mobile application for the rideshare service that is installed in a mobile device of the user, the request being in response to an initial request, by the user, to initiate the communication session where the initial request comprises the language preference parameter;

obtain language capability information for a plurality of agents associated with the remote monitoring platform;

assign an agent of the plurality of agents associated with the remote monitoring platform to the communication session based on the language preference parameter, the language capability information, and service information associated with the alarm monitoring service provided by the remote monitoring platform to the backend system; and cause the communication session to be established between the agent and the user.

2. A system that is configured to communicate with a third-party computing environment, the third-party computing environment including a third-party backend system that is configured to provide computing functionality for a rideshare service, the system comprising:

a first computing environment including a remote monitoring platform and being configured to communicate with the third-party backend system;

the remote monitoring platform comprising processing circuitry configured to:

receive, from the third-party backend system, a request to initiate a communication session between a user of the rideshare service and the remote monitoring platform of the first computing environment, the request including a language preference parameter that is preconfigured for a mobile application for the rideshare service that is installed in a mobile device of the user, the request being in response to an initial request, by the user, to initiate the communication session where the initial request comprises the language preference parameter;

obtain language capability information for a plurality of agents associated with the remote monitoring platform;

assign an agent of the plurality of agents associated with the remote monitoring platform to the communication session based on the language preference parameter and the language capability information; and cause the communication session to be established between the agent and the user.

3. The system of claim 2, wherein the processing circuitry is further configured to:

determine, based on the language capability information, that another agent of the plurality of agents is capable of communicating using a language corresponding to the language preference parameter; and encode for display at least one user interface that indicates an availability status of the other agent.

4. The system of claim 3, wherein the at least one user interface further comprises at least one user interface element that facilitates the other agent being added to the communication session.

5. The system of claim 2, wherein the processing circuitry is further configured to maintain a queue for a plurality of users associated with a plurality of requests to initiate a plurality of communication sessions.

6. The system of claim 2, wherein the processing circuitry is further configured to assign the agent to the communication session further based on at least one of:

a time of day the communication session is received;

a day of a week the communication session is received; or a third-party preference established by a third party associated with the rideshare service provided by the third party to the mobile device.

7. The system of claim 2, wherein the processing circuitry is further configured to request the language preference parameter from the mobile device of the user in which the mobile application is installed.

8. The system of claim 2, wherein the processing circuitry is further configured to receive the language preference parameter from the mobile device of the user in which the mobile application is installed.

9. The system of claim 2, wherein the processing circuitry is further configured to request the language preference parameter from the third-party backend system.

10. A method implemented by a remote monitoring platform of a first computing environment, the first computing environment being configured to communicate with a third-party computing environment that includes a third-party backend system that is configured to provide computing functionality for a rideshare service, the method comprising:

receiving, from the third-party backend system, a request to initiate a communication session between a user of the rideshare service and the remote monitoring platform of the first computing environment, the request including a language preference parameter that is preconfigured for a mobile application for the rideshare service that is installed in a mobile device of the user, the request being in response to an initial request, by the user, to initiate the communication session where the initial request comprises the language preference parameter;

obtaining language capability information for a plurality of agents associated with the remote monitoring platform;

assigning an agent of the plurality of agents associated with the remote monitoring platform to the communication session based on language preference parameter and the language capability information; and causing the communication session to be established between the agent and the user.

11. The method of claim 10, further comprising:

determining, based on the language capability information, that another agent of the plurality of agents is capable of communicating using a language corresponding to the language preference parameter; and encoding for display at least one user interface that indicates an availability status of the other agent.

12. The method of claim 11, wherein the at least one user interface further comprises at least one user interface element that facilitates the other agent being added to the communication session.

13. The method of claim 10, further comprising maintaining a queue for a plurality of users associated with a plurality of requests to initiate a plurality of communication sessions.

14. The method of claim 10, further comprising assigning the agent to the communication session further based on at least one of:

a time of day the communication session is received;

a day of a week the communication session is received; or a third-party preference established by a third party associated with the rideshare service provided by the third party to the mobile device.

15. The method of claim 10, further comprising requesting the language preference parameter from the mobile device of the user in which the mobile application is installed.

16. The method of claim 10, further comprising at least one of:

receiving the language preference parameter from the mobile device of the user in which the mobile application is installed; or requesting the language preference parameter from the third-party backend system.

* * * * *